United States Patent
Kawabe

(10) Patent No.: US 8,657,222 B2
(45) Date of Patent: Feb. 25, 2014

(54) DRAG MECHANISM FOR DUAL-BEARING REEL

(75) Inventor: Yuzo Kawabe, Osaka (JP)

(73) Assignee: Shimano Inc., Osaka (JP)

( * ) Notice: Subject to any disclaimer, the term of this patent is extended or adjusted under 35 U.S.C. 154(b) by 142 days.

(21) Appl. No.: 13/455,799

(22) Filed: Apr. 25, 2012

(65) Prior Publication Data

US 2012/0318902 A1 Dec. 20, 2012

(30) Foreign Application Priority Data

Jun. 20, 2011 (JP) ................................. 2011-136279

(51) Int. Cl.
*A01K 89/01* (2006.01)

(52) U.S. Cl.
USPC ............ 242/302; 242/250; 242/266; 242/295

(58) Field of Classification Search
USPC .......... 242/265, 266, 250, 295, 297–300, 302
See application file for complete search history.

(56) References Cited

U.S. PATENT DOCUMENTS

| 5,267,707 | A | 12/1993 | Oliva | |
|---|---|---|---|---|
| 6,189,822 | B1 | 2/2001 | Ikuta | |
| 6,364,230 | B1 * | 4/2002 | Kawasaki | 242/289 |
| 6,474,580 | B1 * | 11/2002 | Hirayama | 242/289 |
| 6,530,535 | B2 * | 3/2003 | Oishi et al. | 242/295 |
| 7,699,257 | B2 * | 4/2010 | Takechi et al. | 242/319 |
| 7,866,587 | B2 * | 1/2011 | Ikuta et al. | 242/270 |
| 2005/0006512 | A1 | 1/2005 | Morimoto et al. | |
| 2008/0173745 | A1 * | 7/2008 | Takechi et al. | 242/321 |
| 2011/0011967 | A1 * | 1/2011 | Takechi | 242/302 |

FOREIGN PATENT DOCUMENTS

JP S51-010152 Y 3/1976

OTHER PUBLICATIONS

Extended European Search Report of the corresponding European Application No. 12166407.2, dated Oct. 22, 2012.

* cited by examiner

*Primary Examiner* — Emmanuel M Marcelo
(74) *Attorney, Agent, or Firm* — Global IP Counselors

(57) ABSTRACT

A drag mechanism is configured to brake rotation of a spool in a fishing-line releasing direction about a handle shaft. The drag mechanism includes a drag regulation member, a drag washer, a handle, a one-way clutch, and a cam. The drag regulation member is configured to regulate drag force, where the drag regulation member includes an operating part and a regulation nut. The regulation nut is axially movably and unitarily rotatably coupled to the operating part. The regulation nut is screwed onto an outer peripheral surface of a tip end of the handle shaft. The drag washer is disposed onto the handle shaft. The handle is disposed between the drag washer and the drag regulation member. The one-way clutch is configured to prevent rotation of the handle shaft in the fishing-line releasing direction. The cam mechanism is configured to increase the drag force.

10 Claims, 9 Drawing Sheets

DRAG MECHANISM FOR DUAL-BEARING REEL

CROSS-REFERENCE TO RELATED APPLICATIONS

This application claims priority to Japanese Patent Application No. 2011-136279 filed on Jun. 20, 2011. The entire disclosure of Japanese Patent Application No. 2011-136279 is hereby incorporated herein by reference.

BACKGROUND

1. Field of the Invention

The present invention relates to a drag mechanism, particularly to a drag mechanism for a dual-bearing reel, which is configured to brake rotation of a dual-bearing reel spool in a fishing-line releasing direction about a handle shaft.

2. Background Art

Drag mechanisms for dual-beating reels are mainly classified into a star drag type and a lever drag type. A drag mechanism of the star drag type is disposed about a handle shaft, whereas a drag mechanism of the lever drag type is disposed about a spool shaft. Japan Examined Utility Model Registration No. JP-Y-S51-010152 describes an example of the well-known drag mechanisms of the star drag type for regulating drag force by actions of a drag regulating member disposed on the axial end of the handle shaft and a predetermined pivot range of a handle disposed between the drag regulating member and a reel unit. The well-known drag mechanism includes a drag regulating member screwed onto the tip of a handle shaft, a drag washer, and a handle disposed between the drag regulating member and the drag washer. The handle is screwed onto a screw member attached onto the handle shaft. The screw member is axially movable and unitarily rotatable with the handle shaft. The pivot range of the handle is restricted by a restricting member attached onto the handle shaft in a unitarily rotatable state. The screw member includes a male threaded portion on the outer periphery thereof. Further, a coil spring is disposed between the screw member and the handle.

In the drag mechanism thus structured, drag force is regulated by rotating the drag regulating member. In fishing under a drag regulated condition, drag force is increased by rotating the handle in the fishing-line winding direction in response to fish bite. On the other hand, the handle is rotated in the fishing-line releasing direction when the fishing line is required to be reeled out to deal with movement of the hooked fish. Accordingly, the handle pivots at a predetermined angle and drag force is reduced. As a result, the fishing line can be reeled out.

SUMMARY

In the well-known drag mechanism, the entire drag regulating member is screwed onto the handle shaft. Therefore, the position of an operating part of the drag regulating member is changed in the axial direction of the handle shaft in conjunction with rotation of the drag regulating member. Further, the position of the handle is also changed in accordance with the position of the drag regulating member in the axial direction of the handle shaft. Therefore, the position of the handle is changed in a wide range in the axial direction of the handle shaft. It is difficult to perform a quick and smooth drag operation when the positions of the drag regulating member and the handle are changed in the axial direction of the handle shaft. It is an advantage of the present invention to provide a drag mechanism for a dual-bearing reel, which is configured to regulate drag force using a handle and a drag regulating member for preventing the handle and the drag regulating member from largely moving in the axial direction of a handle shaft in performing a drag operation.

A drag mechanism for a dual-bearing reel is provided. The drag mechanism is configured to brake rotation of a spool in a fishing-line releasing direction about a handle shaft. The drag mechanism includes a drag regulation member, a drag washer, a handle, a one-way clutch, and a cam. The drag regulation member is configured to regulate drag force, where the drag regulation member includes an operating part and a regulation nut. The regulation nut is axially movably and unitarily rotatably coupled to the operating part. The regulation nut is screwed onto an outer peripheral surface of a tip end of the handle shaft. The drag washer is disposed onto the handle shaft, where the drag washer is disposed closer to a base end of the handle shaft than to the drag regulation member. The handle is disposed between the drag washer and the drag regulation member, where the handle is unitarily rotatably disposed onto the handle shaft. The handle is pivotable at a predetermined angle between a first position and a second position being away from the first position along a fishing-line winding direction. The one-way clutch is configured to prevent rotation of the handle shaft in the fishing-line releasing direction. The cam mechanism is configured to increase the drag force regulated by the drag regulation member by a predetermined amount in conjunction with pivot of the handle from the first position to the second position.

BRIEF DESCRIPTION OF THE DRAWINGS

Referring now to the attached drawings which form a part of this original disclosure.

DETAILED DESCRIPTION OF THE EXEMPLARY EMBODIMENTS

Structure of Motor Driven Reel

Figure 1:
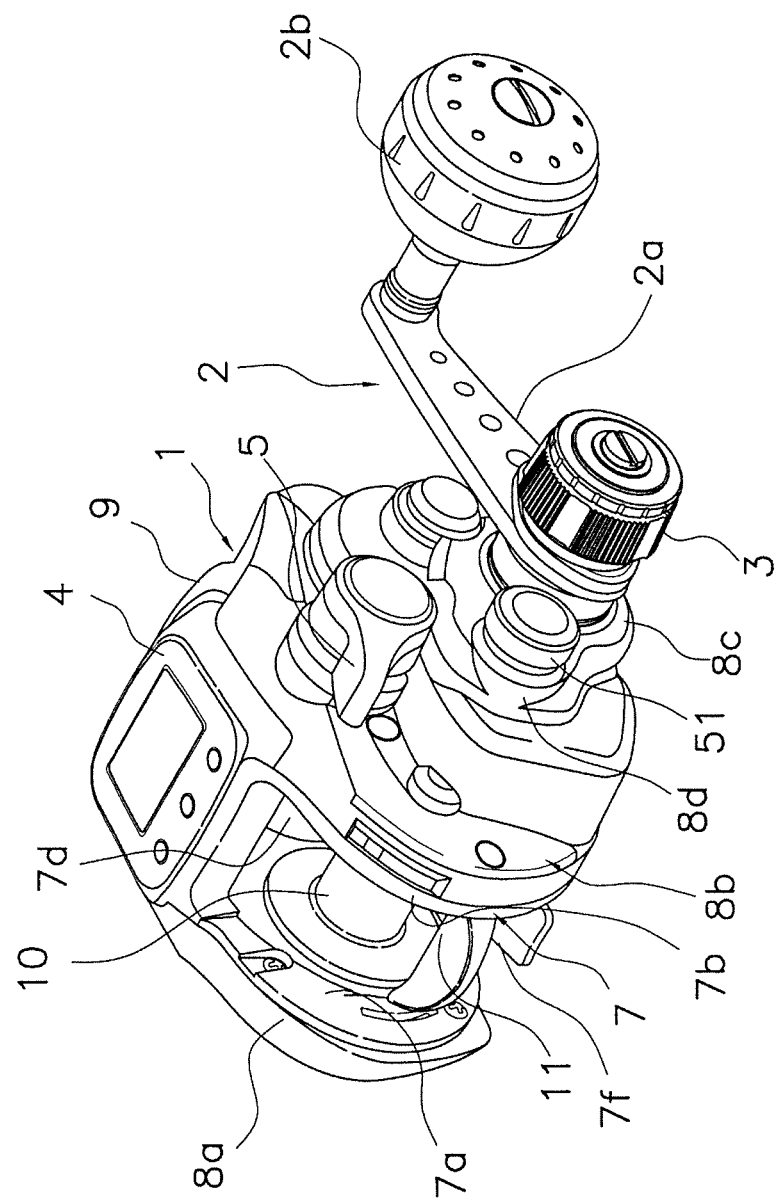
FIG. 1 is a perspective view of a motor driven reel employing an exemplary embodiment of the present invention.
Figure 2:
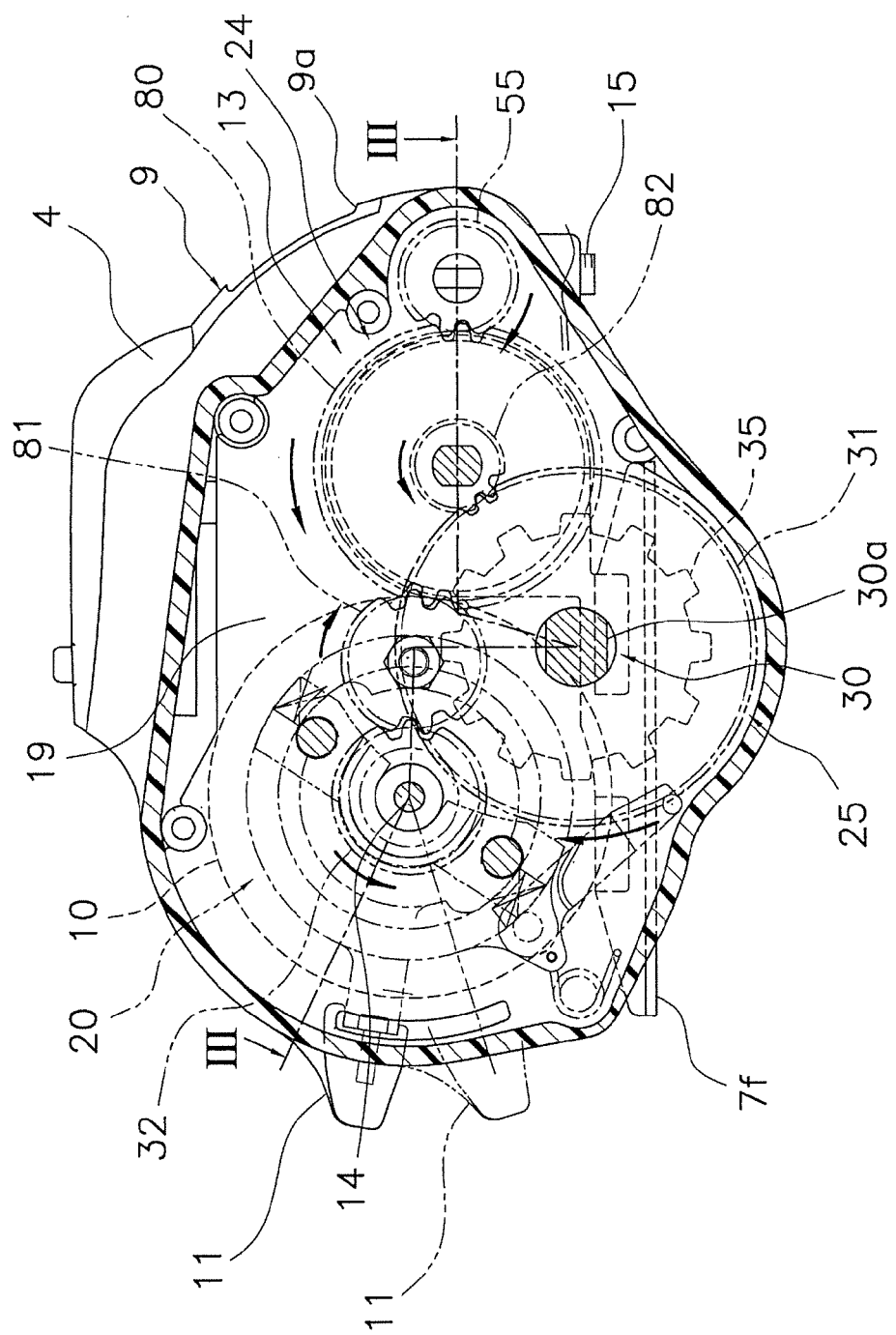
FIG. 2 is a cross-sectional side view of a second side cover of the motor driven reel.
Figure 3:
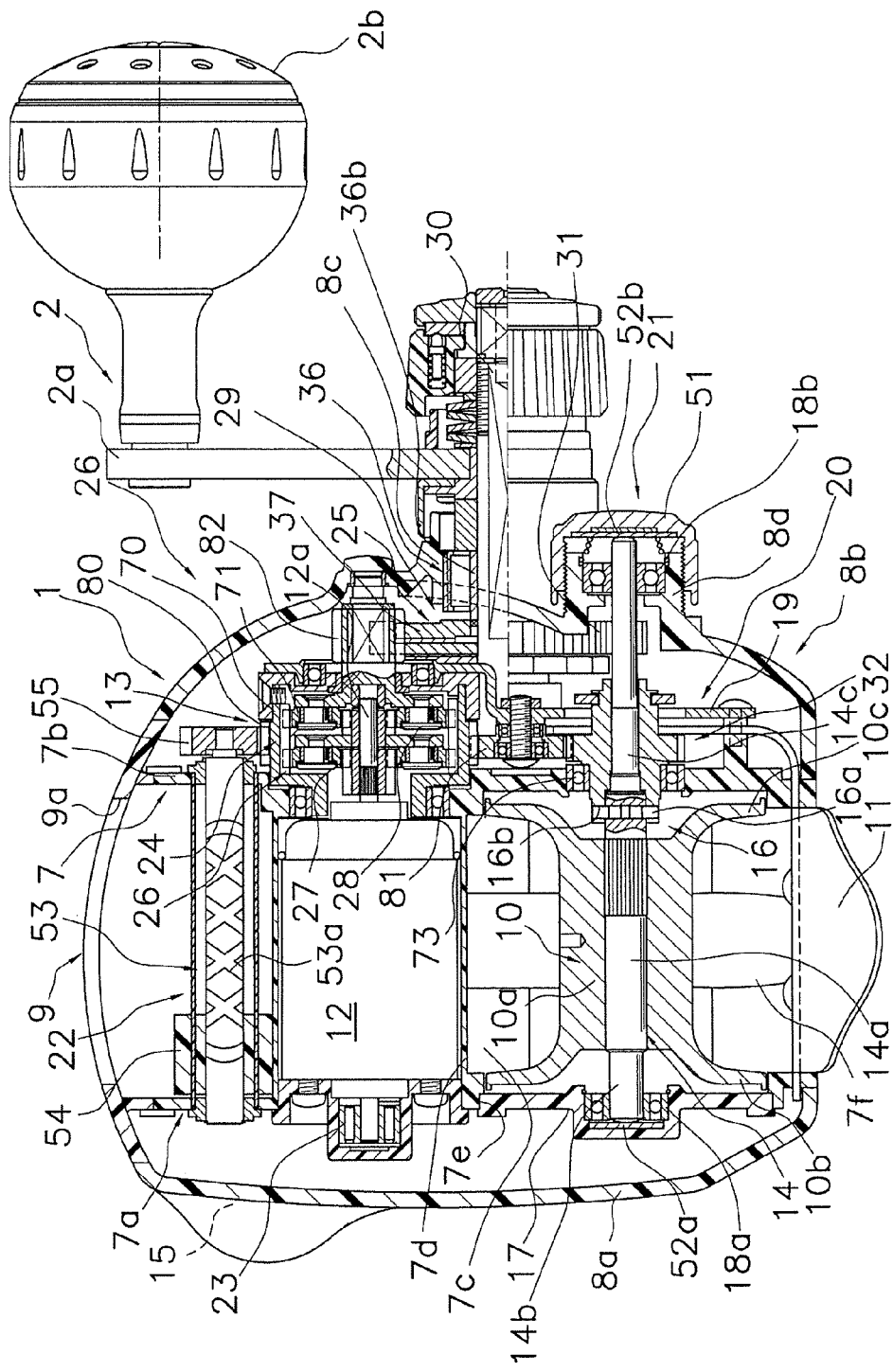
FIG. 3 is a cross-sectional view of FIG. 2 sectioned along a line III-III.

FIGS. 1, 2 and 3 illustrate a motor driven reel employing an exemplary embodiment of the present invention. The motor driven reel is configured to be driven by electric power supplied from an external power source. The electric reel is also embedded with a power source configured to be activated in using the motor driven reel as a manual reel. Further, the motor driven reel has a water depth displaying function of displaying the water depth of a terminal tackle in accordance with the released/wound fishing-line length.

The motor driven reel includes a handle 2, a reel unit 1, a counter case 4, and a spool 10. The reel unit 1 is attachable to a fishing rod. The counter case 4 is disposed on the top of the reel unit 1. The spool 10 is disposed within the reel unit 1 for winding the fishing line. Further, the motor driven reel includes a spool drive mechanism 13 configured to drive the spool 10.

The reel unit 1 includes a frame 7, a first side cover 8a, a second side cover 8b, and a front cover 9. The frame 7 includes a first side plate 7a, a second side plate 7b, a first coupling member 7c, and a second coupling member 7d. The first and second coupling members 7c and 7d couple the first side plate 7a and the second side plate 7b. The second side cover 8b covers a handle attached side of the frame 7, whereas the first side cover 8a covers the other side of the frame 7, which is opposite to the handle attached side. The front cover 9 covers the front part of the frame 7.

As illustrated in FIG. 3, the first side plate 7a includes a circular opening 7e for allowing the spool 10 to pass therethrough. A spool support portion 17 is attached to the circular opening 7e while the axis thereof is appropriately aligned. The spool support portion 17 supports a first end (i.e., a left end in FIG. 3) of the spool shaft 14 of the spool 10 in a rotatable state. The spool support portion 17 is screwed into the outer surface of the first side plate 7a. The spool support portion 17 accommodates a first bearing 18a supporting the first end of the spool shaft 14.

The second side plate 7b is provided for attaching a variety of mechanisms thereto. The spool drive mechanism 13, a clutch control mechanism 20 configured to control a clutch mechanism 16 to be described, and a casting control mechanism 21 are disposed between the second side plate 7b and the second side cover 8b.

On the other hand, the spool 10, the clutch mechanism 16, and a level wind mechanism 22 configured to uniformly wind the fishing line onto the spool 10 are disposed between the first side plate 7a and the second side plate 7b. The clutch mechanism 16 is configured to be switched between a power transmission permission state (i.e., a clutch-on state) for allowing transmission of mechanical power to the spool 10 and a power transmission prevention state (i.e., a clutch-off state) for preventing transmission of mechanical power to the spool 10. A clutch operating member 11 is pivotably disposed in the rear part of the reel unit 1 while being interposed between the first side plate 7a and the second side plate 7b. The clutch operating member 11 is operated for switching the clutch mechanism 16 between the clutch-on state and the clutch-off state. The clutch operating member 11 is pivotable between a clutch-on position (depicted with a solid line in FIG. 2) and a clutch-off position (depicted with a dashed two-dotted line in FIG. 2).

The reel unit 1 further includes a mechanism attachment plate 19 for attaching thereto and disposing the aforementioned mechanisms in the space between the second slide plate 7a and the second side cover 8b. The mechanism attachment plate 19 keeps a predetermined interval from the outer surface of the second side plate 7b. Further, the mechanism attached plate 19 is fixed to the outer surface of the second side plate 7b by screws.

The first coupling member 7c couples the bottom part of the first side plate 7a and that of the second side plate 7b at two positions. The second coupling member 7d couples the first side plate 7a and the second side plate 7b in front of the spool 10. The first coupling member 7c is a plate-shaped member and includes a fishing rod attachment leg 7f in a roughly center part thereof in the right-and-left direction. The fishing rod attachment leg 7f is integrally formed with the first coupling member 7c. The fishing rod attachment leg 7f serves to attach the motor driven reel onto the fishing rod. The second coupling member 7d is a roughly cylindrical member and accommodates therein a motor 12 configured to drive the spool 10 (see FIGS. 2 and 3).

The first side cover 8a is fixed to the outer edge of the first side plate 7a by screws, for example. A connector 15, which is oriented downward, is attached to the bottom surface of the front part of the first side cover 8a for connecting a power cable thereto.

Figure 5:
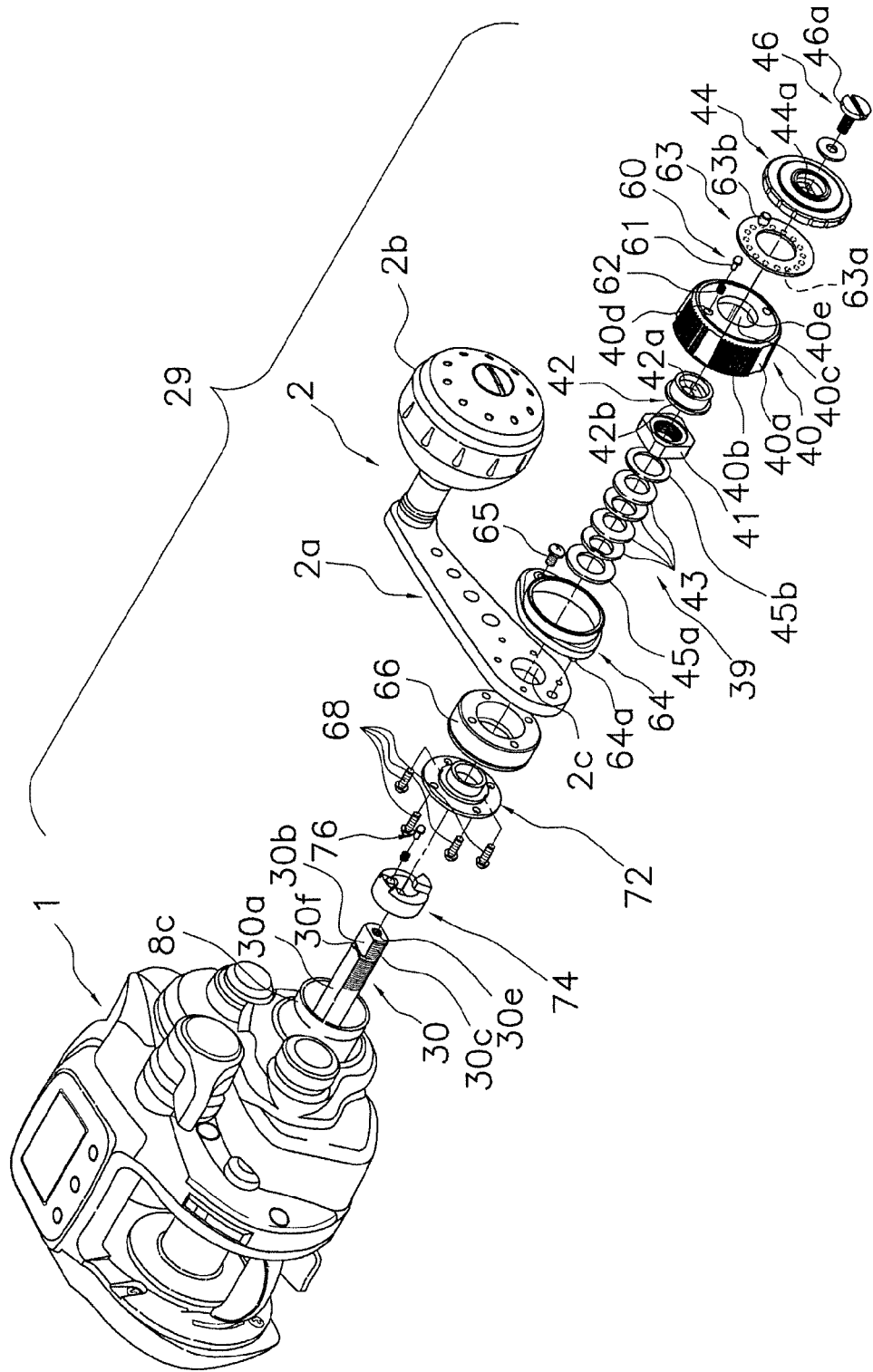
FIG. 5 is an exploded perspective view of the drag mechanism.

The handle 2 is disposed on the second side cover 8b side. As illustrated in FIGS. 1, 3 and 5, the handle 2 includes a handle arm 2a and a handle knob 2b attached to the tip of the handle arm 2a.

The second side cover 8b includes a first boss 8c outwardly protruded for supporting a handle shaft 30 in a rotatable state. The second side cover 8 further includes a second boss 8d disposed behind the first boss 8c. The second boss 8d is outwardly protruded for supporting a second end of the spool shaft 14. Further, a regulation lever 5 (see FIG. 1), which is positioned above the first boss 8c, is pivotably supported by the second side cover 8b. The regulation lever 5 is operated for controlling the motor 12 at a plurality of levels.

The front cover 9 is fixed to the front part outer surface of the first side plate 7a and that of the second side plate 7b at two positions up and down by screws for example. The front cover 9 includes a horizontally elongated opening 9a (see FIG. 2) for allowing the fishing line to pass therethrough.

As illustrated in FIGS. 1 and 2, the counter case 4 is disposed on the top of the first and second side plates 7a and 7b. The counter case 4 is fixed to the outer surfaces of the first and second side plates 7a and 7b by screws. The counter case 4 accommodates a liquid crystal display for displaying water depth. The counter case 4 further accommodates a reel controller configured to control the motor 12 and the liquid crystal display. For example, the reel controller is implemented by a microcomputer.

The spool 10 is attached to the spool shaft 14 while being unitarily rotatable therewith. The spool 10 is formed by a tubular bobbin trunk 10a, a first flange 10b and a second flange 10c. The bobbin trunk 10a is a tubular portion. The first and second flanges 10b and 10c are large-diameter portions integrally formed with the both ends of the bobbin trunk 10a. The spool shaft 14 is fixed into the inner periphery of the bobbin trunk 10a by a suitable fixation method such as press-fitting.

As described above, the first end of the spool shaft 14 is supported by the spool support portion 17 through the first bearing 18a. On the other hand, the second end (i.e., the right end in FIG. 3) of the spool shaft 14 is supported by the second boss 8d of the second side cover 8b through a second bearing 18b.

The spool shaft 14 is formed by a large diameter portion 14a, a first small diameter portion 14b, and a second small diameter portion 14c. The large diameter portion 14a is a portion that the spool 10 is fixed. The first small diameter portion 14b is positioned on the first end side of the large diameter portion 14a, whereas the second small diameter portion 14c is positioned on the second end side of the large-diameter portion 14a. Further, a clutch pin 16a, which forms a part of the clutch mechanism 16, radially penetrates a part of the large diameter portion 14a, which is positioned on the second diameter portion 14c side of the spool fixed portion.

The clutch mechanism 16 includes the clutch pin 16a and a clutch recess 16b. The clutch recess 16b is radially recessed crisscross on an end surface (i.e., the left-side end surface in FIG. 3) of a pinion gear 32 to be described. The pinion gear 32 forms a part of the clutch mechanism 16, and simultaneously, forms a part of a first rotation transmission mechanism 24 to be described. The pinion gear 32 is configured to be moved along the spools haft 14 between the clutch-on position illustrated in FIG. 3 and the clutch-off position arranged rightwards of the clutch-on position (see FIG. 3). In the clutch-on position, the clutch pin 16a is engaged with the clutch recess 16b. Rotation of the pinion gear 32 is thereby transmitted to the spool shaft 14. Thus, the clutch mechanism 16 is set to be in the clutch-on state. In the clutch-on state, the pinion gear 32 and the spool shaft 14 are unitarily rotatable. In the clutch-off position, in contrast, the clutch recess 16b is moved away from the clutch pin 16a. Rotation of the pinion gear 32 is thereby prevented from being transmitted to the spool shaft 14. Thus, the clutch mechanism 16 is set to be in the clutch-off state. The spool 10 is herein allowed to freely rotate.

The clutch control mechanism 20 is configured to switch the clutch mechanism 16 between the clutch-on state and the clutch-off state in response to pivot of the clutch operating member 11 between the clutch-on position depicted with a solid line in FIG. 2 and the clutch-off position depicted with a dashed two-dotted line in FIG. 2.

As illustrated in FIG. 3, the casting control mechanism 21 is configured to press the both ends of the spool shaft 14 for braking the spool 10. The casting control mechanism 21 includes a brake cap 51, a first brake plate 52a, and a second brake plate 52b. The brake cap 51 is screwed onto the outer peripheral surface of the second boss 8d. The first brake plate 52a makes contact with the first end of the spool shaft 14 while being disposed within the spool support portion 17. On the other hand, the second brake plate 52b makes contact with the second end of the spool shaft 14 while being disposed within the brake cap 51.

The level wind mechanism 22 includes a worm shaft 53 and a fishing-line guide 54. The both ends of the worm shaft 53 are rotatably supported by the first and second side plates 7a and 7b. The fishing-line guide 54 is engaged with the worm shaft 53. The worm shaft 53 includes intersecting helical grooves 53a on the outer peripheral surface thereof. A driven gear 55, which is coupled to the spool drive mechanism 13, is attached to the right end (see FIG. 3) of the worm shaft 53 while being unitarily rotatable therewith. The fishing-line guide 54 is guided and moved along the axis direction of the worm shaft 53. Specifically, the fishing-line guide 54 is engaged with the helical grooves 53a of the worm shaft 53, and is thereby configured to be reciprocated along the worm shaft 53 in conjunction with rotation of the worm shaft 53. With the structure, the fishing line is roughly uniformly wound about the spool 10 in conjunction with rotation of the spool 10 in the fishing-line winding direction.

Structure of Spool Drive Mechanism

Figure 4:
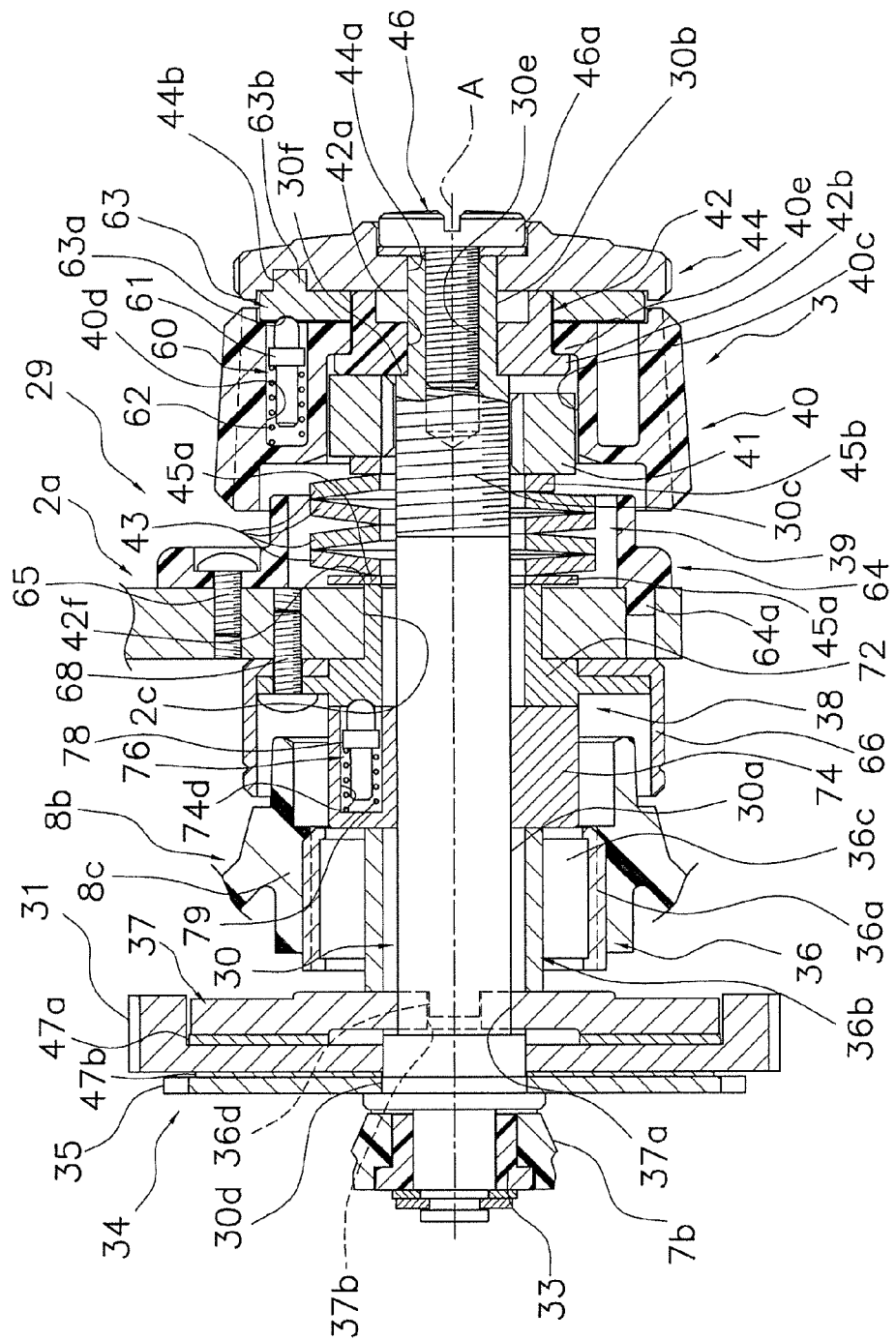
FIG. 4 is an enlarged cross-sectional view of a drag mechanism.

The spool drive mechanism 13 is configured to drive the spool 10 in the fishing-line winding direction. Further, the spool drive mechanism 13 is configured to produce drag force for the spool 10 in winding the fishing line in order to prevent cutting of the fishing line. As illustrated in FIGS. 2 to 4, the spool drive mechanism 13 includes the motor 12, an anti-reverse part 23, the first rotation transmission mechanism 24, and a second rotation transmission mechanism 25. The ant-reverse part 23 is configured to prevent rotation of the motor 12 in the fishing-line winding direction. The first rotation transmission mechanism 24 is configured to reduce the rotational speed of the motor 12 and transmit the reduced rotation of the motor 12 to the spool 10. On the other hand, the second rotation transmission mechanism 25 is configured to increase the rotational speed of the handle 2 through the first rotation transmission mechanism 24 and transmit the increased rotation of the handle 2 to the spool 10.

The motor 12 is accommodated in the aforementioned second coupling member 7d. Rotation of the motor 12 in the fishing-line releasing direction is prevented by the anti-rotation part 23 of a roller clutch type.

Structure of First Rotation Transmission Mechanism

The first rotation transmission mechanism 24 includes a planetary reduction mechanism 26 coupled to an output shaft 12a of the motor 12. The planetary reduction mechanism 26 is configured to reduce the rotational speed of the motor 12 at a reduction ratio roughly in a range of 1/30 to 1/20 and transmit the reduced rotation to the spool 10. The planetary reduction mechanism 26 includes a first planetary gear mechanism 27 and a second planetary gear mechanism 28. The first planetary gear mechanism 27 is coupled to the output shaft 12a of the motor 12. The second planetary gear mechanism 28 is coupled to the first planetary gear mechanism 27. The planetary reduction mechanism 26 is accommodated in a case 70. The both ends of the case 70 are rotatably supported by the second side plate 7b and the mechanism attached plate 19. The case 70 includes a spur-internal gear 71 for the first and second planetary gear mechanisms 27 and 28 on the inner peripheral surface thereof. A sun gear of the first planetary gear mechanism 27 is coupled to the output shaft 12a while being unitarily rotatable therewith. On the other hand, a sun gear of the second planetary gear mechanism 28 is coupled to a carrier of the first planetary gear mechanism 27 while being unitarily rotatable therewith. The output of the spur-internal gear 71 formed in the case 70 is configured to be transmitted to the spool 10.

As illustrated in FIGS. 2 and 3, the first rotation transmission mechanism 24 further includes a first gear member 80, a second gear member 81, and the pinion gear 32. The second gear member 81 is meshed with the first gear member 80. The pinion gear 32 is meshed with the second gear member 81. The first gear member 80 is formed on the outer periphery of the case 70 of the planetary reduction mechanism 26. Therefore, the first gear member 80 is unitarily rotatable with the spur-internal gear 71. The first gear member 80 is also meshed with the driven gear 55 of the level wind mechanism 22. The second gear member 81 is disposed between the mechanism attached plate 19 and the outer surface of the second side plate 7b. The second gear member 81 is an intermediate gear configured to transmit rotation of the first gear member 80 to the pinion gear 32 while the rotational direction of the pinion gear 32 becomes identical to that of the first gear member 80. The second gear member 81 is rotatably supported by the mechanism attached plate 19. The pinion gear 32 is attached to the second side plate 7b through a third bearing 73 attached to the second side plate 7b while being axially movable and rotatable about the spool shaft 14. The pinion gear 32 is controlled by the clutch control mechanism 20, and is thereby configured to be axially moved between the clutch-on position and the clutch-off position.

Structure of Second Rotation Transmission Mechanism

As illustrated in FIGS. 2, 3, 4 and 5, the second rotation transmission mechanism 25 includes the handle shaft 30 onto which the handle 2 is unitarily rotatably coupled, a drive gear 31, a third gear member 82, and a drag mechanism 29 of an exemplary embodiment of the present invention.

As illustrated in FIG. 3, the handle shaft 30 is rotatably supported by the second side plate 7b and the first boss 8c of the second side cover 8b. As illustrated in FIG. 4, the handle shaft 30 includes a pair of first chamfered portions 30a on the outer peripheral surface thereof. The first chamfered portions 30a are formed in parallel to each other. Further, the handle shaft 30 includes a pair of second chamfered portions 30b and a male threaded portion 30c on the outer peripheral surface of a tip end thereof. The chamfered pitch (i.e., the axial length) of the second chamfered portions 30b is less than that of the first chamfered portions 30a. The male threaded portion 30c is engaged with a drag regulation member 3. Yet further, the handle shaft 30 includes third chamfered portions 30d. The third chamfered portions 30d are four facets positioned on the base end side of the first chamfered portions 30a. Furthermore, the handle shaft 30 includes a female threaded portion 30e threaded into the tip surface thereof at a predetermined depth.

A drag washer 37 of the drag mechanism 29 is attached to the first chamfered portions 30a while being unitarily rotatable therewith. A ratchet wheel 35 of a first one-way clutch 34 of a claw type (note a clutch claw is not illustrated in the figures) is attached to the third chamfered portions 30d while being unitarily rotatable therewith. The ratchet wheel 35 is attached thereto while being restricted from being moved axially inwards (i.e., leftwards in FIG. 4). The base end of the handle shaft 30 is rotatably supported by the second side plate 7b through a bearing 33. Further, the handle shaft 30 is supported by the first boss 8c of the second side cover 8b through a second one-way clutch 36 of a roller type. The one-way clutch 34 prevents rotation of the handle shaft 30 in the fishing-line releasing direction. On the other hand, the second one-way clutch 36 quickly prevents rotation of the handle shaft 30 in the fishing-line releasing direction. The second one-way clutch 36 includes an outer race 36a, an inner race 36b and a roller 36c. The outer race 36a is non-rotatably attached to the first boss 8c. The inner race 36b is rotatably coupled to the handle shaft 30. The roller 36c is disposed between the outer race 36a and the inner race 36b. The inner race 36b is coupled to the drag washer 37 while being contactable to and unitarily rotatable therewith. The inner race 36b includes at least an engaging protrusion 36d (see FIG. 4) axially extended. The engaging protrusion 36d is engaged with the drag washer 37.

The drive gear 31 is rotatably attached to the handle shaft 30. The drive gear 31 is configured to be pressed by the drag washer 37. The drag mechanism 29 is configured to brake rotation of the drive gear 31 in the fishing-line releasing direction. Rotation of the spool 10 is thereby braked in the fishing-line releasing direction.

The third gear member 82 is disposed for transmitting rotation of the handle 2 to the spool 10. The third gear member 82 is coupled to a carrier of the second planetary gear mechanism 28 while being unitarily rotatable therewith. The third gear member 82 is meshed with the drive gear 31 for transmitting rotation of the handle 2 to the carrier of the second planetary gear mechanism 28. Rotation, which is transmitted to the carrier, is then transmitted to the pinion gear 32 through the first gear member 80 and the second gear member 81. The reduction ratio from the third gear member 82 to the second gear member 81 is set to be roughly "1".

Structure of Drag Mechanism

The drag mechanism 29 is of a star drag type configured to brake rotation of the spool 10 about the handle shaft 30 in the fishing-line releasing direction. As illustrated in FIGS. 4 and 5, the drag mechanism 29 includes the drag regulation member 3, the drag washer 37, the handle arm 2a, the one-way clutch 34, a cam mechanism 38, and a first urging member 39. The drag regulation member 3 is disposed on one end (tip) of the handle shaft 30. In other words, the drag regulation member 3 is disposed outwards of the handle arm 2a in the axial direction of the handle shaft 30. The drag regulation member 3 includes an operating part 40, a regulation nut 41, and a rotation support member 42. The regulation nut 41 is coupled to the operating part 40 while being axially movable and unitarily rotatable therewith. The rotation support member 42 supports the operating part 40 in a rotatable state.

For example, the operating part 40 is a slightly tapered tubular member made of synthetic resin. The operating part 40 is attached to the handle shaft 30 through the rotation support member 42 (an exemplary movement restricting member) while being rotatable relative to the handle shaft 30. The operating part 40 is configured to be unitarily rotated with the handle 2 in a normal rotational operation of the handle 2. However, the operating part 40 is configured to be rotated relatively to the handle 2 for performing a drag regulation operation.

The operating part 40 is disposed in a predetermined tip side position on the handle shaft 30. By a positioning member 44, the operating part 40 is restricted from moving outward (rightward in FIG. 4) in the axial direction of the handle shaft 30. As illustrated in FIG. 5, the operating part 40 includes a plurality of (e.g., five) recesses 40a and a plurality of convexo-concave portions 40b on the outer peripheral surface thereof for smoothly performing a rotational operation. Each convexo-concave portion 40b is interposed between adjacent two recesses 40a. Thus, the recesses 40a (and the convexo-concave portions 40b) are aligned at predetermined intervals along the circumferential direction of the operating part 40. As represented in FIG. 4, the operating part 40 includes a nut accommodating portion 40c and a pin accommodating portion 40d in the inside thereof. The pin accommodating portion 40d is disposed radially outwards of the nut accommodating portion 40c.

The nut accommodating portion 40c has an inner peripheral surface with a non-circular cross-section. In the present exemplary embodiment, the nut accommodating portion 40c has an inner peripheral surface with a rectangular cross-section. The non-circular cross-sectional shape of the inner peripheral surface of the nut accommodating portion 40c is not herein limited to a rectangular shape and can be a hexagonal shape or an oval shape. The regulation nut 41 is attached to the nut accommodating portion 40c while being axially movable and unitarily rotatable therewith. The nut accommodating portion 40c includes an annular protrusion 40e protruded radially inwards. The annular protrusion 40e is engaged with the rotation support member 42.

The regulation nut 41 has a rectangular outer peripheral surface. In conjunction with rotation of the operating part 40, the regulation nut 41 is screwed onto the male threaded portion 30c and is moved in the spool shaft direction.

The rotation support member 42 is disposed for rotatably supporting and retaining the operating part 40. The rotation support member 42 has a non-circular inner peripheral surface 42a to be engaged with the second chamfered portions 30b. In the present exemplary embodiment, the rotation support member 42 has the oval inner peripheral surface. Therefore, the rotation support member 42 is configured to be unitarily rotated with the handle shaft 30. The rotation support member 42 includes a brim portion 42b on the outer peripheral surface thereof. The brim portion 42b is engaged with the annular protrusion 40e of the operating part 40 for restricting the operating part 40 from moving axially inwards (leftwards in FIG. 4). The rotation support member 42 is restricted from moving axially inwards by a step 30f formed between the second chamfered portions 30b and the first chamfered portions 30a. Consequently, the annular protrusion 40e is restricted from moving axially inwards (leftwards in FIG. 4) by the brim portion 42b. The operating part 40 is accordingly restricted from moving axially inwards (leftwards in FIG. 4).

The pin accommodating portion 40d accommodates a hitting pin 61 of a drag operation sound producing mechanism 60 for producing sounds in conjunction with a drag regulation operation. The hitting pin 61 is allowed to protract from and retract to the accommodated position thereof. Specifically, the drag operation sound producing mechanism 60 is configured to produce sounds in conjunction with a rotational operation of the operating part 40. Further, the drag operation sound producing mechanism 60 is configured to position the operating part 40 in any one of a plurality of circumferential rotational positions. The drag operation sound producing mechanism 60 includes the hitting pin 61, a coil spring 62, and a sound producing member 63. The coil spring 62 is configured to urge the hitting pin 61 towards the protracting direction of the hitting pin 61. The sound producing member 63 is engaged with the hitting pin 61. The hitting pin 61 is a pin member having a hemispheric tip. The sound producing member 63 is a disc shaped member unitarily rotatable with the handle shaft 30. The sound producing member 63 includes a plurality of sound producing recesses 63a on the back face thereof, i.e., the face opposed to the drag regulation member 3. The sound producing recesses 63a are aligned at predetermined intervals along the circumferential direction of the sound producing member 63. The sound producing recesses 63a are engaged with the hitting pin 61. Further, the sound producing member 63 includes an engaging protrusion 63b on the front surface thereof. The engaging protrusion 63b is engaged with the positioning member 44.

Figure 11:
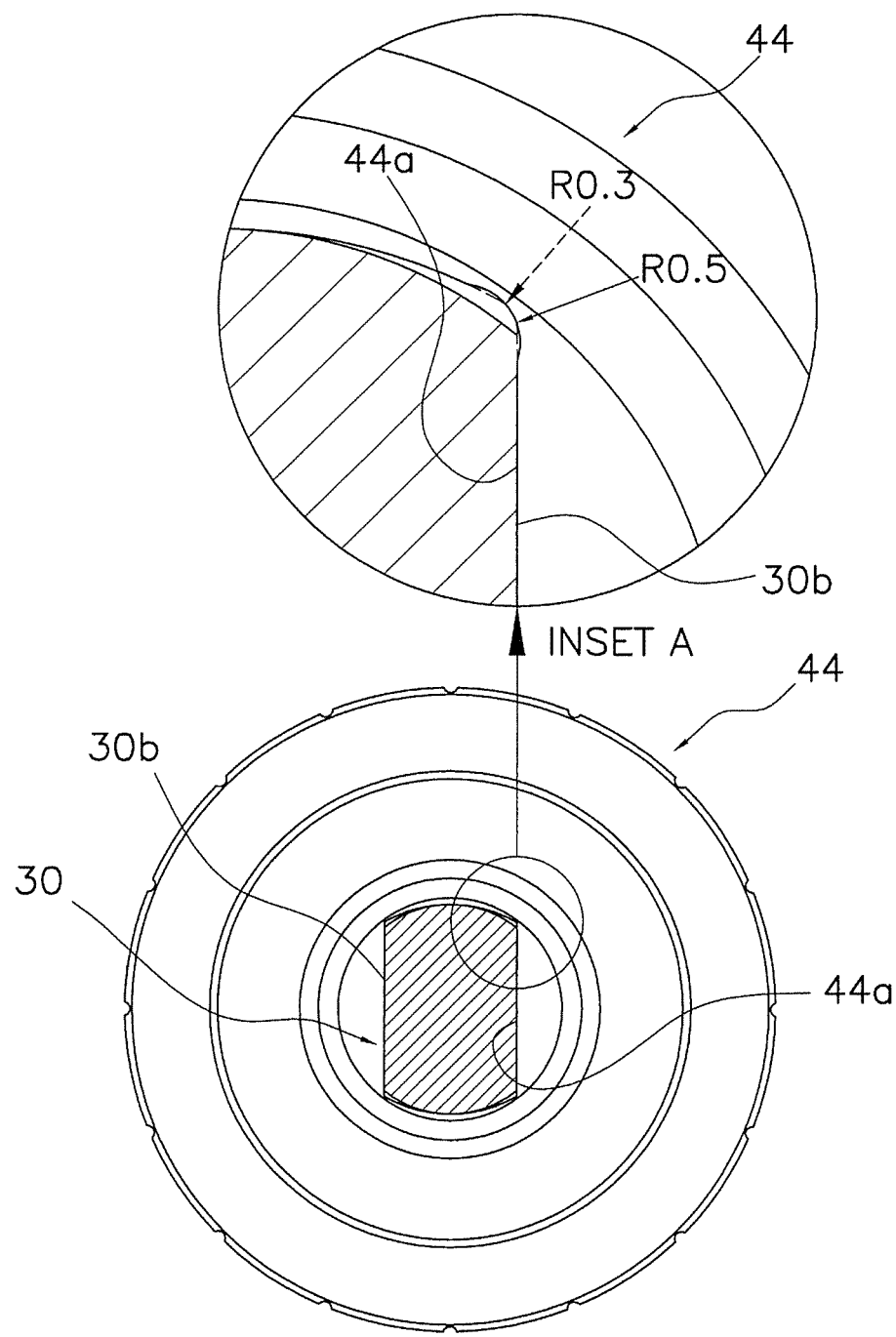
FIG. 11 is a diagram illustrating a processed state the inner peripheral surface of a positioning member.

The positioning member 44 is a disc shaped member unitarily rotatably attached to the tip of the handle shaft 30. The positioning member 44 has a non-circular inner peripheral surface 44a to be engaged with the second chamfered portions 30b of the handle shaft 30. Therefore, the positioning member 44 is unitarily rotated with the handle shaft 30. The inner peripheral surface 44a of the positioning member 44 is formed by machining, and the cross-sectional shape thereof is obtained by cutting out two segments from a circle along two parallel straight lines as illustrated in FIG. 11. The inner peripheral surface 44a has been so far formed by stamping. As depicted with a broken line in Inset A of FIG. 11, a circular-arc portion and a straight-line portion of the inner peripheral surface 44a are connected through a round chamfer (i.e., fillet) with a radius of 0.3 mm. However, a large amount of load acts on a tool in forming such small-diameter portions by machining. In view of this, in the present exemplary embodiment, a circular-arc portion and a straight-line portion of the inner peripheral surface 44a are connected through a round chamfer (i.e., fillet) with a radius of 0.5 mm, which is recessed radially outwards on the circular-arc portion and the straight-line portion of the inner peripheral surface 44a by a depth of 0.2 mm, as depicted with a solid line in Inset A of FIG. 11. Accordingly, the inner peripheral surface 44a can be easily formed by machining without applying a large amount of load to the tool.

The positioning member 44 is attached to the handle shaft 30 by a head 46a of a bolt member 46 while being unitarily rotatable therewith. The bolt member 46 is herein screwed into the female threaded portion 30e formed in the tip surface of the handle shaft 30. The positioning member 44 includes an engaged recess 44b on a face thereof opposed to the sound producing member 63. The engaged recess 46b is engaged with the engaging protrusion 63b. Accordingly, the sound producing member 63 is unitarily rotated with the handle shaft 30.

As illustrated in FIG. 4, the drag washer 37 has a non-circular (e.g., oval) inner peripheral surface 37a to be engaged with the first chamfered portions 30a of the handle shaft 30. Further, the drag washer 37 includes an engaged recess 37b. The engaged recess 37b is coupled to the engaging protrusion 36d of the inner race 36b of the second one-way clutch 36 while being unitarily rotatable therewith. The drag washer 37 is configured to press the drive gear 31. The drive gear 31 is configured to be braked while being interposed between the ratchet wheel 35 and the drag washer 37. In other words, the ratchet wheel 35 additionally functions as a drag washer. A first drag disc 47a which is made, for example, of felt or carbon is attached between the drag washer 37 and the drive gear 31. On the other hand, a second drag disc 47b made of e.g., felt or carbon is attached between the drive gear 31 and the ratchet wheel 35.

As described above, the one-way clutch 34 includes the ratchet wheel 35 and a ratchet claw (not illustrated in the figures). The one-way clutch 34 is configured to prevent rotation of the handle shaft 30 in the fishing-line releasing direction. It should be noted that at least either of the second one-way clutch 36 and the first one-way clutch 34 can be used as a one-way clutch of the drag mechanism 29.

For example, the handle arm 2a is a plate shaped member made of aluminum alloy. The base end of the handle arm 2a is coupled to the handle shaft 30. Accordingly, the handle arm 2a is pivotable at a predetermined angle between a first position and a second position pivoted from the first position in the fishing-line winding direction. Further, the handle arm 2a is unitarily rotatable with the handle shaft 30 in an angular range except for the predetermined pivot angle. For example, the predetermined angle is preferably set to be greater than or equal to 90 degrees and less than or equal to 150 degrees. In the present exemplary embodiment, the predetermined angle is set to be greater than or equal to 115 and less than or equal to 125 degrees. The setting of pivot at a predetermined angle is provided for actuating the cam mechanism 38. A first cover member 64 made of synthetic resin is attached to the outer surface (right-side surface in FIG. 4) of the base end of the handle arm 2a. The first cover member 64 is a brimmed tubular member disposed for covering the first urging member 39. The first cover member 64 includes a positioning protrusion 64a to be positioned by the handle arm 2a. The first cover member 64 is fixed to the outer surface of the handle arm 2a by a screw member 65.

A second cover member 66 and the cam mechanism 38 are disposed on the inner surface (left-side surface in FIG. 4) of the base end of the handle arm 2a. The handle arm 2a includes an attachment hole 2c on the base end thereof for attaching the cam mechanism 38 thereto. The second cover member 66 is disposed for covering the cam mechanism 38. The second cover member 66 is a closed-end member made of metal such as aluminum alloy. The second cover member 66, together with a first cam member 72 which will be described hereinafter, is fixed to the inner surface of the handle arm 2a by a plurality of (e.g., four) screw members 68.

The cam mechanism 38 is provided for increasing drag force regulated by the drag regulation member 3 by a predetermined amount in conjunction with pivot of the handle arm 2a from the first position to the second position. Further, the cam mechanism 38 is provided for restricting the pivot range of the handle arm 2a to a predetermined angle. The cam mechanism 38 includes the first cam member 72 and a second cam member 74. The first cam member 72 is unitarily rotated with the handle arm 2a. The second cam member 74 is engaged with the first cam member 72. Further, the first cam member 72 is fixed to the handle arm 2a together with the second cover member 66 by the screw members 68. The second cam member 74 is attached to the first chamfered portions 30a of the handle shaft 30 while being unitarily rotatable with the handle shaft 30. Yet further, a second urging member 76 is disposed between the first cam member 72 and the second cam member 74 for preventing wobble of the handle arm 2a.

Figure 6:
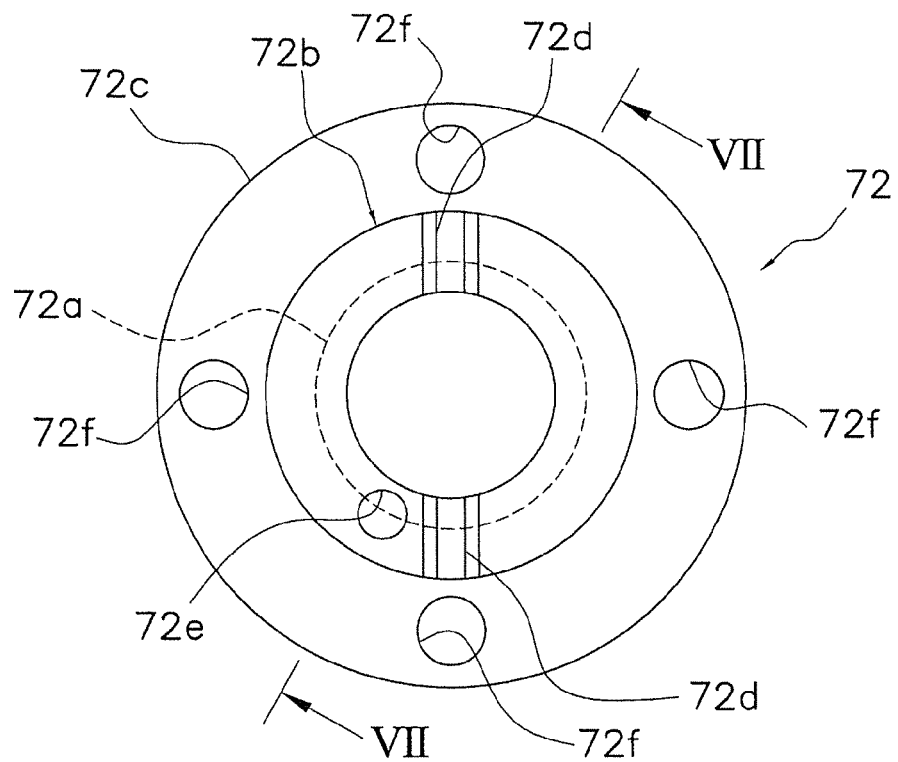
FIG. 6 is a front view of a first cam member.
Figure 7:
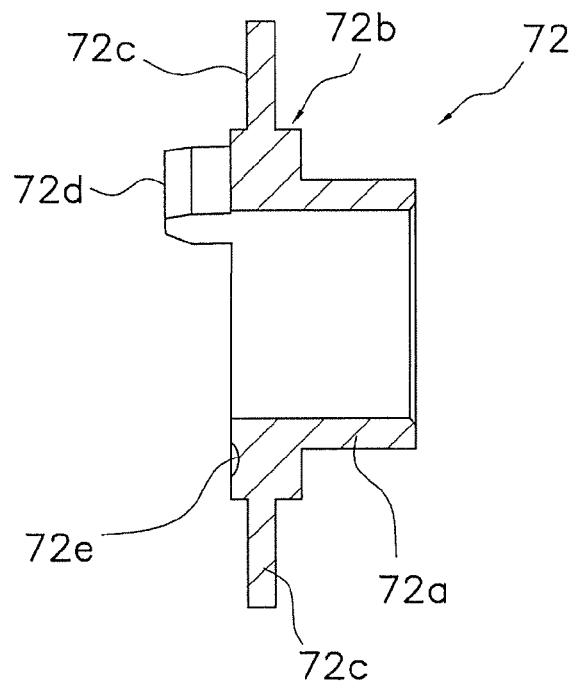
FIG. 7 is a cross-sectional view of FIG. 6 sectioned along a line VII-VII.

As illustrated in FIGS. 6 and 7, the first cam member 72 is a flanged member made of, for instance, copper-system alloy such as special high tension brass. The first cam member 72 includes an attached tubular portion 72, a cam receiving portion 72b, and a flanged portion 72c. The attached tubular portion 72a is fitted with the handle arm 2a. The cam receiving portion 72b is a large diameter portion formed on the outer peripheral surface of an end of the attached tubular portion 72a. The flanged portion 72c is formed on the outer peripheral surface of the cam receiving portion 72b. The inner peripheral surface of the attached tubular portion 72a, which has a circular cross-section, is rotatably attached onto the handle shaft 30. On the other hand, the outer peripheral surface of the attached tubular portion 72a is fitted into the attachment hole 2c of the handle arm 2a. As illustrated in FIG. 4, the tip end of the attached tubular portion 72a is protruded from the face of the handle arm 2a and makes contact with a first washer member 45a to be described. The structure prevents scratching between the handle arm 2a and the first washer member 45a.

As illustrated in FIGS. 6 and 7, the cam receiving portion 72b includes a pair of cam protrusions 72d on the back face thereof, i.e., the face opposed to the second cam member 74. The cam protrusions 72d are protruded towards the second cam member 74 while being disposed along the diameter of the cam receiving portion 72b. Further, the cam receiving portion 72b includes an engaged recess 72e on the back face thereof. The engaged recess 72e is spherically recessed, and the second urging member 76 can be engaged therewith while being positioned adjacent to one of the cam protrusion 72d. Each cam protrusion 72d is tapered towards the tip thereof. The tip surface of each cam protrusion 72d is formed by a plane perpendicularly to the handle shaft 30.

The flanged portion 72c is disposed while the flanged portion 72c and the handle arm 2a interpose the second cover member 66 therebetween. The flanged portion 72c includes four screw-passing through holes 72f circumferentially aligned at predetermined intervals. The first cam member 72 is fixed to the handle arm 2a together with the second cover member 66 while the screw members 68 are screwed into the handle arm 2a through the screw-passing through holes 72f.

Figure 8:
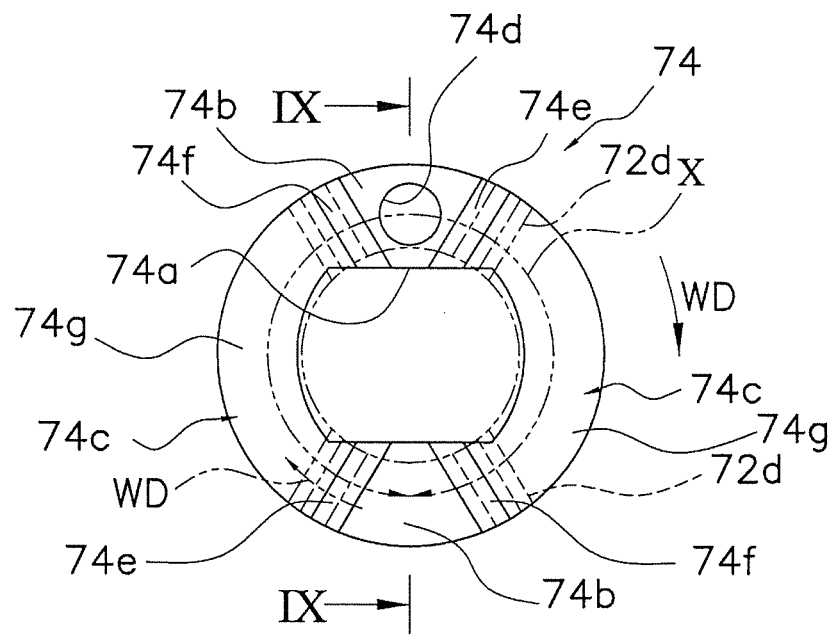
FIG. 8 is a front view of a second cam member.
Figure 9:
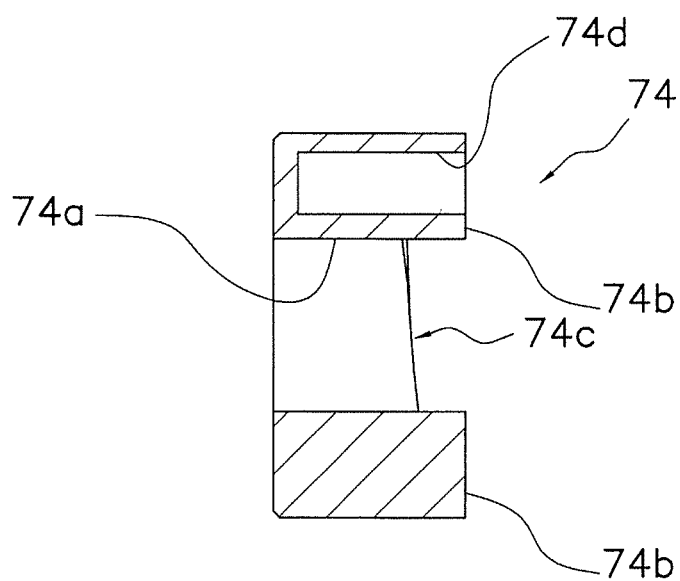
FIG. 9 is a cross-sectional view of FIG. 8 sectioned along a line IX-IX.

As illustrated in FIGS. 8 and 9, the second cam member 74 is a thick-walled cylindrical member made of metal such as stainless alloy. The second cam member 74 makes contact with the first cam member 72 and the inner race 36b of the second one-way clutch 36 while being interposed therebetween. The second cam member 74 includes a non-circular inner peripheral surface 74a to be engaged with the first chamfered portions 30a. The second cam member 74 includes a pair of restricting protrusions 74b and a pair of slant cam surfaces 74c on the face thereof opposed to the first cam member 72. The slant cam surfaces 74c are herein disposed circumferentially between the restricting protrusions 74b. The restricting protrusions 74b are disposed along the diameter of the second cam member 74. The restricting protrusions 74b are provided for restricting the pivot range of the handle arm 2a to a predetermined angle. The restricting protrusions 74b are shaped for allowing the lateral surfaces of the cam protrusions 72d to make contact therewith. Specifically, the circumferential length of each restricting protrusion 74b is increased from the radially inner position to the radially outer position. One of the restricting protrusions 74b includes an accommodating portion 74d formed into the end surface thereof for accommodating the second urging member 76.

Figure 10:
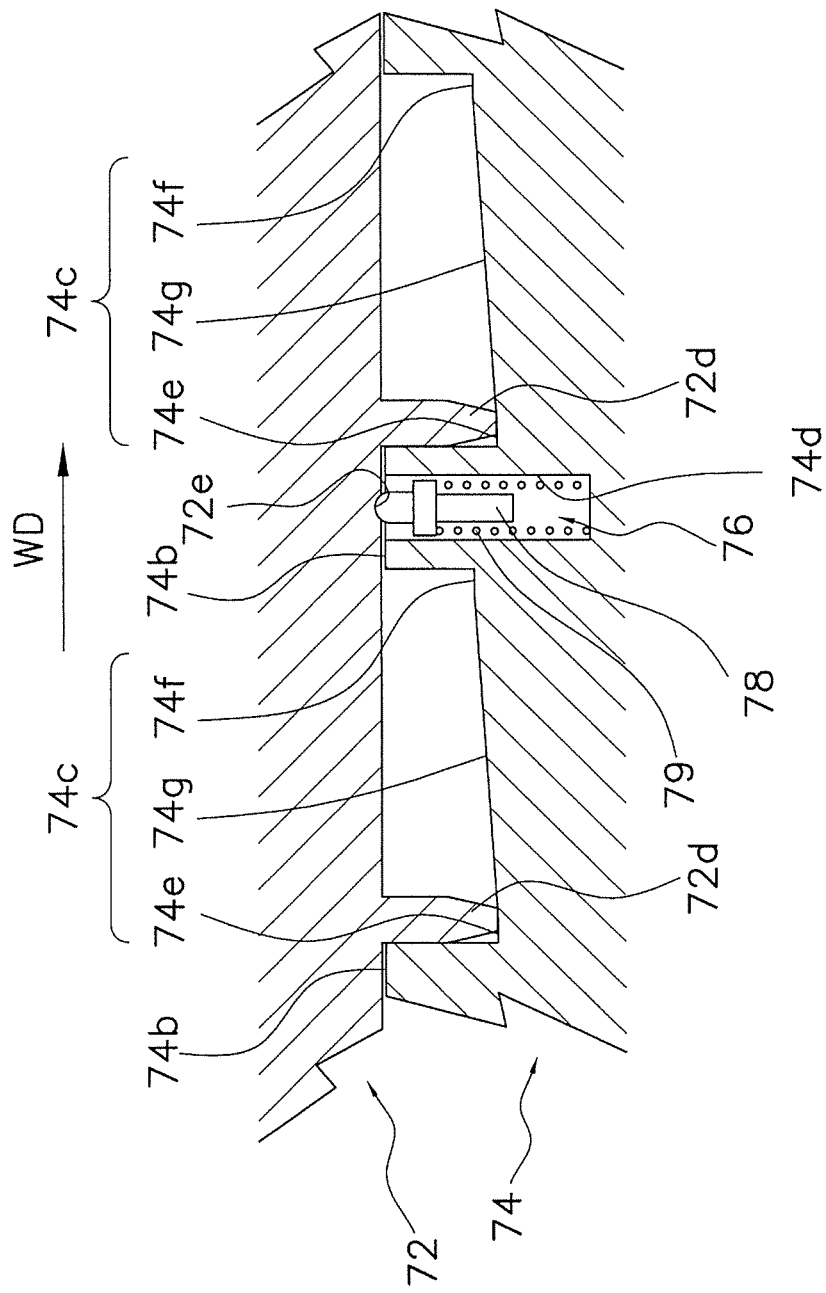
FIG. 10 is a schematic cross-sectional view of a slant cam surface sectioned along a line X in FIG. 8.

The slant cam surfaces 74c are recessed with respect to the restricting protrusions 74b. As schematically illustrated in FIG. 10, each slant cam surface 74c includes a first flat surface section 74e, a second flat surface section 74f and a slant surface section 74g. Each restricting protrusion 74b is interposed between the first flat surface section 74e of one slant cam surface 74c and the second flat surface section 74f of the other slant cam surface 74c. In each slant cam surface 74c, the slant surface section 74g connects the first and second flat surface sections 74e and 74f. The first and second flat surface sections 74e and 74f are formed by planes perpendicular to the handle shaft 30. The first flat surface section 74e is formed in a further recessed position than the second flat surface section 74f. In other words, the second flat surface section 74f is positioned closer to the first cam member 72 than the first flat surface section 74e is.

As depicted with a dashed two-dotted line in FIG. 8, the first flat surface sections 74e are surfaces on which the cam protrusions 72d are disposed when the handle arm 2a is set to be in the first position. As depicted with a broken line in FIG. 8, in contrast, the second flat surface sections 74f are surfaces on which the cam protrusions 72d are disposed when the handle arm 2a is set to be in the second position. For example, axial positional difference between the first and second flat surface sections 74e and 74f is set to be roughly 0.8 to 1.5 mm. Drag force change unwanted for an angler can be inhibited with the first and second flat surface sections 74e and 74f thus structured. Further, the first cam member 72 can be thereby stably stopped when weak drag force is applied.

As illustrated in FIGS. 4 and 10, the second urging member 76 includes an urging pin 78 and a coil spring 79. The urging pin 78 is accommodated in the accommodating portion 74d of the second cam member 74 while being allowed to protract therefrom and retract thereto. The coil spring 79 is configured to urge the urging pin 78 towards the first cam member 72. The urging pin 78 is engaged with the engaged recess 72e of the first cam member 72. The second urging member 76 is configured to urge the first cam member 72 for thereby urging the handle arm 2a towards the drag regulation member 3. Accordingly, wobble of the handle arm 2a is inhibited when weak drag force is applied. Further, the urging pin 78 is configured to be engaged with the engaged recess 72e when the handle arm 2a is set to be in the first position. Therefore, the handle arm 2a can be easily returned to the first position.

As illustrated in FIG. 4, the first urging member 39 is disposed between the regulation nut 41 and the handle arm 2a. The first urging member 39 includes plural pairs (e.g., two pairs) of disc springs 43. In each paired disc springs 43, the outer peripheries thereof make contact with each other while the inner peripheries thereof are disposed away from each other. The first washer member 45a and a second washer member 45 are disposed on the both ends of the first urging member 39. The first washer member 45a is disposed between the first cam member 72 and the disc springs 43, whereas the second washer member 45b is disposed between the regulation nut 41 and the disc springs 43.

The first urging member 39 is used for smoothly changing drag force in minute levels. Drag force is determined by urging force of the first urging member 39. The urging force of the first urging member 39 is regulated by the drag regulation member 3. The upper half of FIG. 4 (i.e., a part above a center axis A of the handle shaft 30) illustrates a condition where the weakest drag force is applied. In contrast, the lower half of FIG. 4 (i.e., a part below the center axis A of the handle shaft 30) illustrates a condition where drag force greater than the weakest drag force is applied. The first urging member 39 is extended or contracted in conjunction with the axial position of the regulation nut 41. The urging force of the first urging member 39 is transmitted to the inner race 36b of the second one-way clutch 36 through the first cam member 72 and the second cam member 74. In response, the inner race 36b presses the drag washer 37. Accordingly, the drive gear 31 is braked, and rotation of the spool 10 in the fishing-line releasing direction is braked.

Actions of Drag Mechanism

In fishing a Pagrus major, the clutch operating member 11 is operated for setting the clutch mechanism 16 to be in the clutch-off state. The fishing line is reeled out by the weight of a terminal tackle for allowing the terminal tackle to reach a shelf position where a school of fish resides. The clutch mechanism 16 is set to be in the clutch-on state when the terminal tackle reaches the shelf position by reeling out the fishing line. Further, the handle arm 2a is set to be in the first position and drag force is relieved for easily hooking a fish when the fish bites bait. An angler waits for fish's biting under the condition. When a fish bites bait and is hooked, the handle 2 is rotated in the fishing-line winding direction. Accordingly, the handle arm 2a is rotated relatively to the handle shaft 30 from the first position to the second position. Rotation of the handle arm 2a is not herein transmitted to the handle shaft 30. However, the first cam member 72 and the second cam member 74 are rotated relatively to each other. Accordingly, the cam protrusions 72d of the first cam member 72 are rotated in the fishing-line winding direction WD as illustrated in FIG. 8. As a result, the cam protrusions 72d are moved from the first flat surface section 74e to the second flat surface section 74f through the slant surface section 74g on the second cam member 74 while making contact therewith. The second cam member 74 thereby moves the first cam member 72 in a direction away from the second cam member 74. When the handle arm 2a reaches the second position, the handle aim 2a is moved towards the drag regulation member 3. The first urging member 39 is herein contracted in accordance with positional difference on the slant cam surfaces 74c of the second cam member 74 in the handle shaft direction. Accordingly, the urging force of the first urging member 39 is increased and the drag force of the drag mechanism 29 is increased by a predetermined amount. When the handle arm 2a is pivoted to the second position, rotation of the handle arm 2a in the fishing-line winding direction is transmitted to the handle shaft 30. When the handle arm 2a is pivoted to the second position, the spool is rotated in the fishing-line winding direction by any one of: an electronic winding action by the motor 12 using the regulation lever 5; a manual winding action by the handle 2; and a manual-electric combinational winding action by both of the motor 12 and the handle 2.

With the aforementioned configuration, an operation of increasing drag force can be accurately and instantly executed and a winding action can be executed simultaneously. Therefore, it is possible to quickly hook a fish with the terminal tackle and subsequently reliably catch a fish.

Features (A) The drag mechanism 29 for a dual-bearing reel is of a star drag type configured to brake rotation of the spool in the fishing-line releasing direction about the handle shaft. The drag mechanism 29 includes the drag regulation member 3, at least one drag washer 37, the handle 2, the first one-way clutch 34 and, the cam mechanism 38. The drag regulation member 3 is configured to regulate drag force. The drag regulation member 3 includes the operating part 40 and the regulation nut 41. The regulation nut 41 is coupled to the operating part 40 while being axially movable and unitarily rotatable therewith. Further, the regulation nut 41 is screwed onto the tip-side outer peripheral surface of the handle shaft 30. At least one drag washer 37 is disposed on the handle shaft 30 while being disposed closer to the base end of the handle shaft 30 than the drag regulation member 3 is. The handle 2 is disposed between the drag washer 37 and the drag regulation member 3. The handle 2 is disposed on the handle shaft 30 while being unitarily rotatable therewith and pivotable at a predetermined angle between the first position and the second position away from the first position in the fishing-line winding direction. The one-way clutch 34 is configured to prevent rotation of the handle shaft 30 in the fishing-line releasing direction. The cam mechanism 38 is configured to increase drag force regulated by the drag regulation member 3 by a predetermined amount in conjunction with pivot of the handle 2 from the first position to the second position.

In the drag mechanism 29 of the motor driven reel, the regulation nut 41 is configured to be axially moved with respect to the handle shaft 30 in conjunction with rotation of the operating part 40 of the drag regulation member 3 screwed onto the handle shaft 30. Accordingly, pressure onto the drag washer 37 is changed through the cam mechanism 38, and drag force is thereby regulated. An angler waits for fish's biting while drag force is regulated at a low level by the drag regulation member 3. When a fish bites bait and is hooked, the handle 2 is rotated from the first position to the second position in the fishing-line winding direction. Rotation of the handle 2 is herein prevented from being transmitted to the handle shaft until the handle 2 pivots to the second position at a predetermined angle. However, the cam mechanism 38 increases drag force by a predetermined amount. As a result, even when low drag force is set by the drag regulation member 3, it is possible to obtain drag force greater than the set low drag force by a predetermined amount by rotating the handle 2 in the fishing-line winding direction. Accordingly, it is possible to perform an action of hooking a fish with a terminal tackle, and thereafter consecutively, perform a fishing-line winding action by either the handle 2 or the motor 12. On the other hand, the handle 2 is pivoted from the second position to the first position in the fishing-line releasing direction when drag force is required to be relieved in winding the fishing line. The cam mechanism 38 accordingly reduces drag force. The drag regulation member 3 herein includes the operating part 40 and the regulation nut 41 that is coupled to the operating part 40 while being axially movable and unitarily rotatable therewith. Therefore, drag force can be regulated while only the regulation nut 41 is axially moved even if the operating part 40 of the drag regulation member 3 is rotated. Consequently, the operating part 40 of the drag regulation member 3 is prevented from moving in the handle shaft direction in a drag operation.

(B) In the drag mechanism 29, the handle shaft 30 includes the step 30f formed on the tip-side outer peripheral surface thereof. The drag mechanism 29 further includes the rotation support member 42, the positioning member 44, and the bolt member 46. The rotation support member 42 is configured to restrict movement of the operating part 40 towards the base end side of the handle shaft 30. The rotation support member 42 is attached onto the handle shaft 30 while its movement towards the base end of the handle shaft 30 is restricted by the step 30f. The positioning member 44 is disposed axially outwards of the operating part 40. The positioning member 44, together with the rotation support member 42, is configured to position the operating part 40 at a predetermined position in the handle shaft direction while interposing the operating part 40 therebetween. The bolt member 46 is configured to retain the positioning member 44.

In this case, movement of the rotation support member 42 towards the base end of the handle shaft 30 is restricted by the step 30f, while movement of the operating part 40 towards the base end of the handle shaft 30 is prevented by the rotation support member 42. Further, the operating part 40 is positioned at a predetermined position in the handle shaft direction, while being interposed between the rotation support member 42 and the positioning member 44 disposed on the opposite side of the rotation support member 42. The positioning member 44 is retained by the bolt member 46. Accordingly, movement of the operating part 40 is prevented in the axial direction of the handle shaft.

(C) In the drag mechanism 29, the handle shaft 30 includes the female threaded portion 30e formed into the tip-side end surface thereof. The retainer member includes the bolt member 46. The bolt member 46 is screwed into the female threaded portion 30e and has the head 46a contactable to the positioning member 44. In this case, the positioning member 44 can be retained by the head 46a of the bolt member 46 to be screwed into the tip-side end surface of the handle shaft 30.

(D) The drag mechanism 29 further includes the first urging member 39. The first urging member 39 is configured to urge the drag washer 37 while being disposed between the regulation nut 41 and the drag washer 37. In this case, the axial displacement amount of the drag regulation member 3 is increased and drag force can be minutely regulated by urging force of the first urging member 39.

(E) In the drag mechanism 29, the rotation support member 42 is disposed on the handle shaft 30 while being unitarily rotatable therewith. Further, the rotation support member 42 supports the operating part 40 in a rotatable state. In this case, the operating part 40 can be rotatably supported by the rotation support member 42. Therefore, the operating part 40 can be smoothly rotated even when being interposed between the rotation support member 42 and the positioning member 44.

(F) In the drag mechanism 29, the cam mechanism 38 includes the first cam member 72 and the second cam member 74. The first cam member 72 is unitarily rotatable with the handle 2 while being axially movable with respect to the handle shaft 30. The second cam member is coupled to the handle shaft 30 while being axially movable and unitarily rotatable therewith. Further, the second cam member is engaged with the first cam member 72. In the cam mechanism 38, the first cam member 72 and the second cam member 74 are configured to be relatively moved away from each other in conjunction with pivot of the handle 2 from the first position to the second position.

In this case, the first cam member 72 and the second cam member 74 are configured to be moved away from each other in conjunction with pivot of the handle 2 from the first position to the second position. Therefore, the axial length (i.e., axial end-to-end distance) of the first cam member 72 and the second cam member 74 is extended. As a result, pressure onto the drag washer 37 is increased and drag force is thereby increased. In contrast, drag force is reduced when the handle 2 is pivoted from the second position to the first position.

(G) The drag mechanism 29 further includes the second urging member 76 disposed between the first cam member 72 and the second cam member 74. The second urging member 76 is configured to press the first cam member 72 towards the drag regulation member 3. In this case, the handle 2 is urged towards the drag regulation member 3 through the first cam member 72 even when the drag regulation member 3 regulates drag force at a low level. Therefore, axial wobble of the handle 2 is inhibited.

(H) In the drag mechanism 29, the first cam member 72 includes a pair of the cam protrusions 72d. The cam protrusions 72d are protruded towards the second cam member 74 while being circumferentially disposed away from each other. The second cam member 74 includes a pair of the slant cam surfaces 74c making contact with the pair of the cam protrusions 72d. In this case, due to engagement between the cam protrusions 72d and the slant cam surfaces 74c, the second cam member 74 can be moved away from the first cam member 72 in conjunction with pivot of the first cam member 72 from the first position to the second position. Therefore, the cam mechanism 38 can be simply structured.

(I) In the drag mechanism 29, the second cam member 74 includes a pair of the restricting protrusions 74b. Each restricting protrusion 74b is disposed circumferentially between a pair of the slant cam surfaces 74c. The restricting protrusions 74b are engaged with a pair of the cam protrusions 72d for restricting the pivot range of the handle 2 to a predetermined angle. In this case, the pivot range of the first cam member 72 can be restricted using a pair of the cam protrusions 72d to be engaged with the slant cam surfaces 74c of the second cam member 74.

(J) In the drag mechanism 29, the dual-bearing reel is the motor driven reel configured to drive the spool 10 in the fishing-line winding direction by the motor 12. In this case, it is possible to start a fishing-line winding action by the motor 12 immediately after either an action of hooking a fish with a terminal tackle using the handle 2 or an action of positioning the terminal tackle on a shelf where a school of fish resides. Therefore, operability of the motor driven reel can be remarkably enhanced.

Other Exemplary Embodiments

An exemplary embodiment of the present invention has been described above. However, the present invention is not limited to the aforementioned exemplary embodiment, and a variety of changes can be herein made without departing from the scope of the present invention.

(a) In the aforementioned exemplary embodiment, the first urging member 39 is disposed between the drag regulation member 3 and the handle arm 2a. In the present invention, however, arrangement of the first urging member 39 is not limited to the above. For example, the first urging member 39 can be disposed between the handle arm 2a and the drag washer 37.

(b) In the aforementioned exemplary embodiment, the motor 12 is disposed outsides the spool 10. However, the present invention can be applied to a drag mechanism for a motor driven reel that a motor is disposed within a spool. In the motor driven reel that the motor is disposed within the spool, rotation of a drive gear is directly transmitted to a pinion gear.

(c) In the aforementioned exemplary embodiment, the first cam member 72 includes the cam protrusions 72d while the second cam member 74 includes the slant cam surfaces 74c. However, arrangement of the cam protrusions and the slant cam surfaces can be opposite to the above. Specifically, the first cam member can include the slant cam surfaces while the second cam member can include the cam protrusions. Further, both of the first and second cam members can include the slant cam surfaces.

(d) The aforementioned exemplary embodiment exemplifies the motor driven reel configured to drive the spool 10 in the fishing-line winding direction by the dual-bearing reel and the motor. However, application of the present invention is not limited to the above. For example, the present invention can be applied to a manual-type dual-bearing reel configured to rotate a spool in the fishing-line winding direction by operating the handle 2. In the case of the manual-type dual-bearing reel, rotation of a drive gear is directly transmitted to a pinion gear.

(e) In the aforementioned exemplary embodiment, the operating part 40 is rotatably supported by the rotation support member 42 as a movement restricting member. In the present invention, however, the structure of supporting the operating part is not limited to the above. For example, the operating part can be rotatably supported by a positioning member. Alternatively, the movement restricting member can be formed in a washer shape and a rotation support member can be provided separately from the movement restricting member.

(f) The aforementioned exemplary embodiment exemplifies the bolt member 46 as a retainer member. In the present invention, however, the retainer member is not limited to the above. For example, an axle snap ring can be used as a retainer member instead of the bolt member.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A drag mechanism for a dual-bearing reel, the drag mechanism configured to brake rotation of a spool in a fishing-line releasing direction about a handle shaft, the drag mechanism comprising:
   a drag regulation member being configured to regulate drag force, the drag regulation member including an operating part and a regulation nut, the regulation nut being axially movably and unitarily rotatably coupled to the operating part, the regulation nut being screwed onto an outer peripheral surface of a tip end of the handle shaft;
   a drag washer being disposed onto the handle shaft, the drag washer being disposed closer to a base end of the handle shaft than to the drag regulation member;
   a handle being disposed between the drag washer and the drag regulation member, the handle being unitarily rotatably disposed onto the handle shaft, the handle being pivotable at a predetermined angle between a first position and a second position being away from the first position along a fishing-line winding direction;
   a one-way clutch being configured to prevent rotation of the handle shaft in the fishing-line releasing direction; and
   a cam mechanism configured to increase the drag force regulated by the drag regulation member by a predetermined amount in conjunction with pivot of the handle from the first position to the second position.

2. The drag mechanism for a dual-bearing reel according to claim 1, wherein
   the handle shaft includes a step formed on the outer peripheral surface thereof,
   the drag mechanism further includes
      a movement restricting member being attached onto the handle shaft, wherein the movement restricting member is restricted from axially moving in a direction away from the tip end of the handle shaft by the step, and the movement restricting member is configured to restrict the operating part from moving in the direction away from the tip end of the handle shaft,
      a positioning member being disposed axially outwards of the operating part, wherein the positioning member is configured to locate the operating part in a predetermined position in a handle shaft direction by interposing the operating part between the positioning member and the movement restricting member, and
      a retainer member retaining the positioning member.

3. The drag mechanism for a dual-bearing reel according to claim 2, wherein
   the handle shaft includes a female threaded portion formed into an end surface of the tip end thereof,
   the retainer member includes a bolt member to be screwed into the female threaded portion, and
   the bolt member includes a head portion allowed to make contact with the positioning member.

4. The drag mechanism for a dual-bearing reel according to claim 2, wherein
   the movement restriction member is unitarily rotatably disposed onto the handle shaft, and
   the movement restriction member is configured to support the operating part in a rotatable state.

5. The drag mechanism for a dual-bearing reel according to claim 1, further comprising
   a first urging member being disposed between the regulation nut and the drag washer, the first urging member configured to urge the drag washer.

6. The drag mechanism for a dual-bearing reel according to claim 1, wherein
   the cam mechanism includes
      a first cam member unitarily being rotatable with the handle and axially movable with respect to the handle shaft, and
      a second cam member being axially movably and unitarily rotatably coupled to the handle shaft, wherein the second cam member is engaged with the first cam member, and
   the first cam member and the second cam member are configured to be relatively moved away from each other when the handle is pivoted from the first position to the second position.

7. The drag mechanism for a dual-bearing reel according to claim 6, further comprising a second urging member being disposed between the first cam member and the second cam member, the second urging member being configured to press the first cam member towards the drag regulation member.

8. The drag mechanism for a dual-bearing reel according to claim 6, wherein one of the first and second cam members includes a pair of cam protrusions, wherein the cam protrusions are disposed circumferentially away from each other, and the cam protrusions protrude towards the other of the first and second cam members, and the other of the first and second cam members includes a pair of slant cam surfaces, wherein the slant cam surfaces making contact with the cam protrusions.

9. The drag mechanism for a dual-bearing reel according to claim 8, wherein the other of the first and second cam members includes a pair of restriction protrusions, each of the restriction protrusions disposed between the slant cam surfaces, and the restriction protrusions are engaged with the cam protrusions for restricting a pivot range of the handle to the predetermined angle.

10. The drag mechanism for a dual-bearing reel according to claim 1, wherein the dual-bearing reel is a motor driven reel being configured to drive the spool in the fishing-line winding direction by a motor.

* * * * *